UNITED STATES PATENT OFFICE.

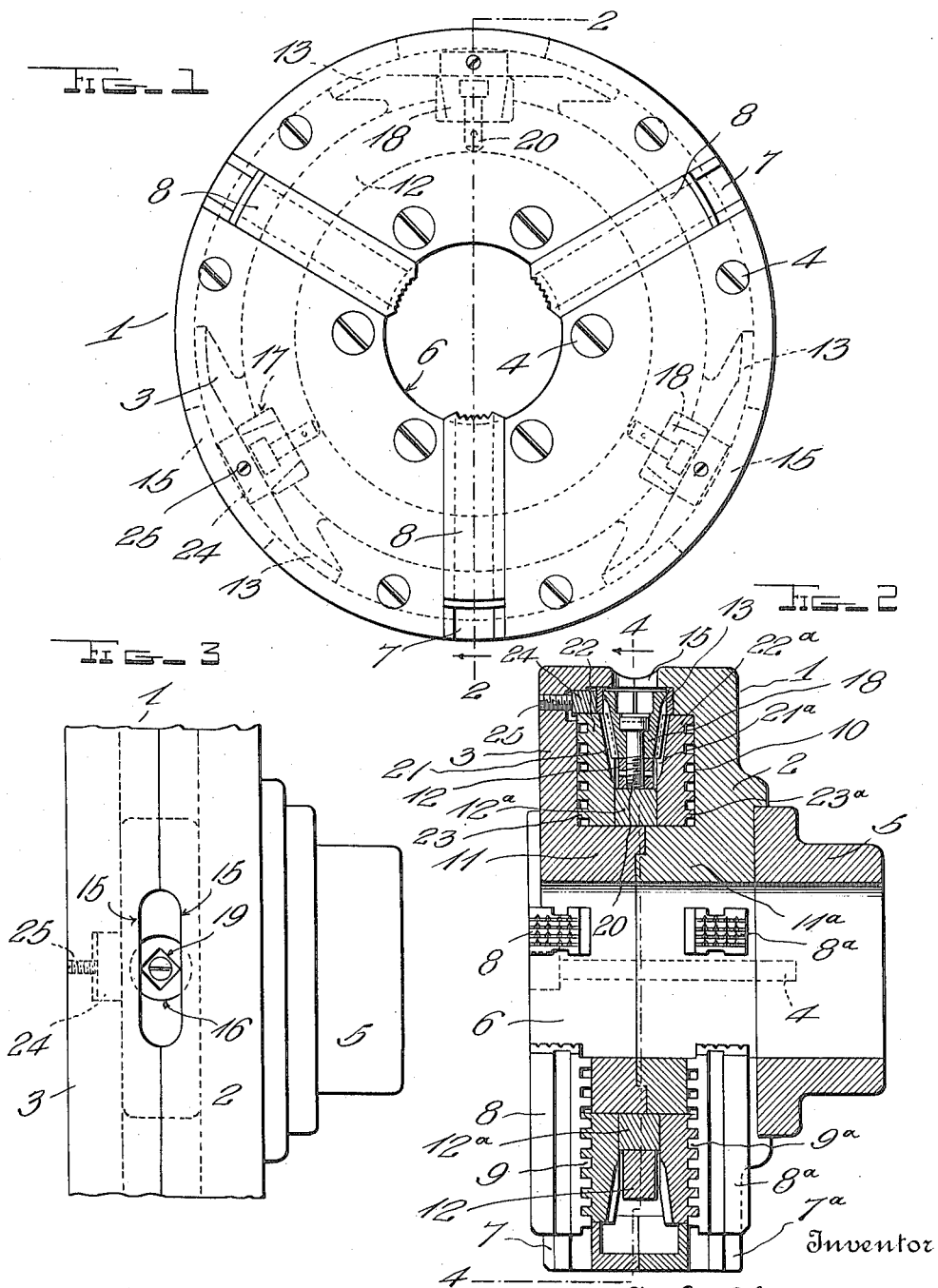

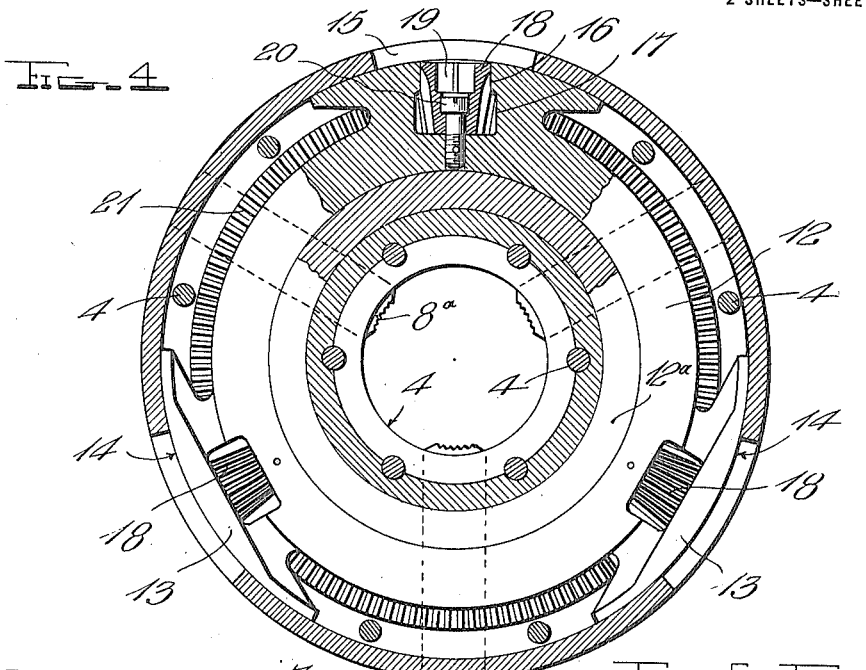
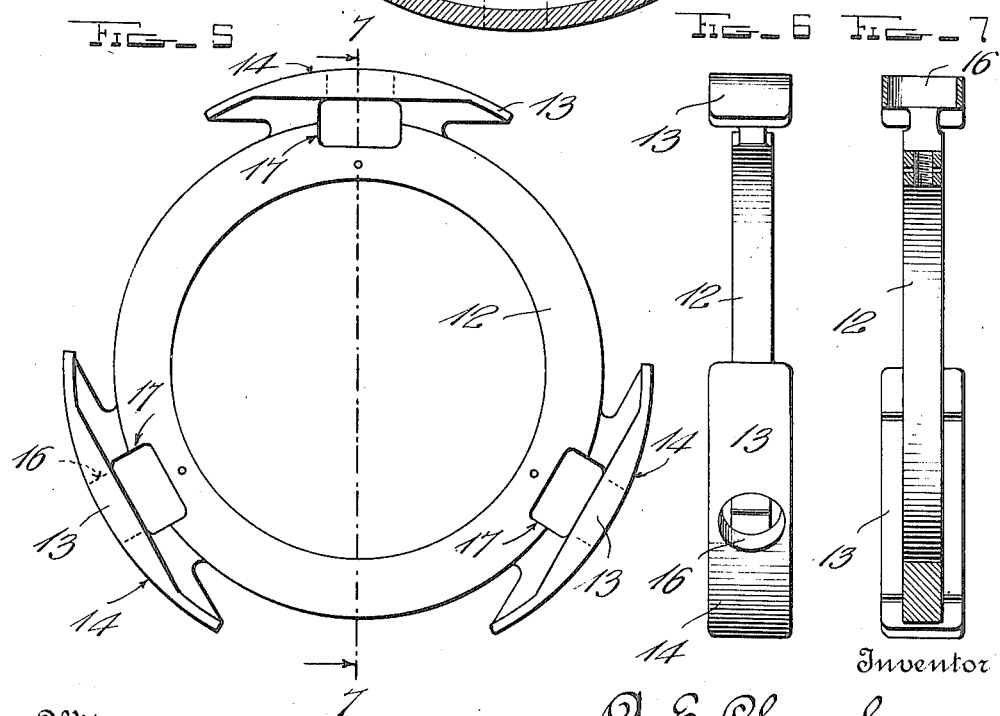

ALBERT E. CHURCH, OF NEW BRITAIN, CONNECTICUT.

MACHINE-CHUCK.

1,181,845.         Specification of Letters Patent.         Patented May 2, 1916.

Application filed October 1, 1915. Serial No. 53,529.

*To all whom it may concern:*

Be it known that I, ALBERT E. CHURCH, a citizen of the United States, residing at New Britain, in the county of Hartford and State of Connecticut, have invented certain new and useful Improvements in Machine-Chucks; and I do declare the following to be a full, clear, and exact description of the invention, such as will enable others skilled in the art to which it appertains to make and use the same.

My invention is an improved chuck designed primarily for use on lathes for gripping tapered work. Heretofore, it has been the usual practice to use the common type of chuck with one set of radially slidable jaws for this purpose, but it has been found that the work cannot be effectively gripped by so doing.

It is therefore the object of the invention to provide a chuck with two longitudinally spaced sets of jaws having operating means whereby said sets will be operated simultaneously until one set comes in contact with the larger diameter of the work, and whereby the other set will continue to move inwardly until the jaws thereof contact with the smaller diameter of such work, thus readily gripping the same and preventing canting and slippage thereof.

In the attainment of the end set forth, I contemplate the use of certain novel features of construction and unique combinations of parts of which the accompanying drawings are illustrative.

In these drawings, Figure 1 is a face view of a chuck constructed in accordance with the invention; Fig. 2 is a vertical longitudinal section thereof taken on the plane of the line 2—2 of Fig. 1; Fig. 3 is a fragmentary side elevation; Fig. 4 is a vertical transverse section taken on the plane of the line 4—4 of Fig. 2 with parts disclosed in elevation; Fig. 5 is a side elevation of the floating bearing ring; Fig. 6 is an edge view thereof; and Fig. 7 is a vertical section taken on the plane of the line 7—7 of Fig. 5.

In describing the invention, I shall refer to these drawings by similar reference characters placed on corresponding parts throughout the several views. To this end, the numeral 1 designates broadly the cylindrical head of the chuck formed of a rear plate 2 and a face plate 3 secured together by screws or the like 4, the plate 2 being equipped with an attaching neck 5 whose bore alines with the usual axial bore 6 formed through the head. The face plate 3 is formed with a plurality of radially disposed guideways 7 of common contour in which jaws 8 are mounted to slide, the inner sides of said jaws being provided with spirally directed teeth 9, while the rear plate 2 is formed with a number of radially located guideways $7^a$ in which additional jaws $8^a$ mounted to slide, the inner faces of these jaws being equipped with teeth $9^a$ similar to the teeth 9. The teeth 9 and $9^a$ are positioned adjacent the opposite sides of an annular guideway 10 formed by grooving the abutting faces of the two plates 2 and 3 concentrically with the axis of the chuck. This construction leaves cylindrical bearing portions 11 and $11^a$ at the centers of the plates 2 and 3 respectively. Mounted rotatably upon a washer $12^a$ surrounding the adjacent ends of the portions 11 and $11^a$ is a floating ring 12, the specific construction of which is seen most clearly in Figs. 4 to 7 inclusive. The outer edge of said ring is preferably spaced inwardly from the outer grooved wall of the annular guideway 10 and said outer edge is provided with a plurality of circumferentially spaced shoes 13 having their outer sides 14 disposed concentrically with the ring, such shoes being provided to close circumferentially spaced slots 15 formed through the abutting faces of the plates 2 and 3 into the guideway 10, the center of each shoe being normally disposed at the center of its respective opening, as clearly shown in Fig. 4.

Formed in each shoe 13 is a central radially extending bearing opening 16 whose inner end is preferably though not necessarily enlarged at 17, the several openings being provided for the reception of pinions 18 whose axes are disposed radially and which are provided with axial bores enlarged at their outer ends into polysided sockets 19 for the reception of a key, while passing through the contracted inner ends of said bores and threaded into the ring 12 are the bearing screws 20.

The several pinions 18 mesh with annular series of gear teeth 21 and $21^a$ formed on the inner sides of scroll rings 22 and $22^a$, the former being rotatably mounted on the bearing portion 11, while the other ring encircles the portion 11ª. The outer sides of the rings 22 and 22ª are provided with scrolls 23 and 23ª which mesh respectively with the teeth 9 and 9ª of the jaws 8 and 8ª.

Preferably used in conjunction with the parts above described, for the purpose of normally preventing movement on the part of the floating ring 12, is a number of friction shoes 24 forced inwardly into contact with the shoes 13 by set screws or the like 25.

By constructing the chuck as above described, when the work is inserted into the bore 6, the usual key (not shown), may be used for rotating any one of the pinions 18, with the result that the two scroll rings 22 and 22ª are turned in opposite directions to move the irrespective jaws inwardly. If the work be of two diameters, one set of jaws will contact with the larger diameter before the other set reaches the work, upon such occurrence the scroll ring of the jaws contacting with the work will be prevented from moving farther. This ring then serves as a track upon which the pinions 18 travel as one of such pinions is further rotated, the result being that the other scroll ring is moved to the necessary amount to project its respective jaws into contact with the smaller diameter of the work. Obviously, while the pinions are traveling on one scroll ring or the other, the key moves within the slot 15 through which it has been inserted, as the entire floating ring 12 turns. The slots 15, however, are closed at all times by the shoes 13 regardless of the extent to which said ring may rotate, thus insuring that dust and dirt may not enter the interior of the chuck.

By providing a chuck operating in the manner just set forth, it will be obvious that work which is tapered or otherwise formed of two diameters, may be effectively gripped. Furthermore, the rear set of jaws serves to brace the work to prevent canting and at the same time provides additional gripping area to reliably prevent slippage of work in the chuck.

From the foregoing description, taken in connection with the accompanying drawings, it will be obvious that I have provided an improved type of chuck which fulfils a long felt need in the art to which it relates, yet that its construction is comparatively simple and inexpensive.

In the drawings, certain specific details have been shown for accomplishing probably the best results, and in the preceding such details have been described, but obviously numerous changes may be made within the scope of the invention without sacrificing any of the advantages thereof.

I claim:—

1. A chuck comprising two independently movable and longitudinally spaced sets of jaws, a single operating member for said jaws, and connections between said member and said jaws for moving the latter successively or in unison.

2. A chuck comprising two independently movable and longitudinally spaced sets of work gripping jaws, a single operating member for said jaws, and pressure equalizing connections between said member and the two sets of jaws for equalizing the gripping power of said sets.

3. A chuck comprising two independently movable and longitudinally spaced sets of work gripping jaws, a pair of movable elements for actuating the two sets of jaws, and a floating rotary operating member having a side concentric to its axis contacting with said elements for moving the same, said member being capable of traveling on one of said elements.

4. A chuck comprising a head having two longitudinally spaced sets of jaws, a pair of circular rotary elements for actuating the two sets of jaws, and a floating rotary operating member for the aforesaid elements having a side concentric with its axis positioned in contact with said elements and capable of traveling along one of the same.

5. A chuck comprising a head having two longitudinally spaced sets of jaws, a pair of spaced jaw actuating rings for operating the two sets of jaws, a floating bearing ring between said jaw actuating rings and concentric therewith, and a rotary operating member carried by said floating bearing ring, said operating member having a side concentric with its axis and positioned in contact with the jaw actuating rings.

6. A chuck comprising a head having two longitudinally spaced sets of jaws, a pair of spaced jaw actuating rings for operating the two sets of jaws, said rings having gear teeth on their inner faces, and a floating pinion interposed between the two rings and meshed with the gear teeth thereon.

7. A chuck comprising a head having two longitudinally spaced sets of jaws, a pair of spaced jaw actuating rings for operating the two sets of jaws, said rings having gear teeth on the outer edge portions of their inner faces, a floating bearing ring interposed between the inner edge portions of the rings and carrying a bearing, and a pinion mounted on said bearing and meshed with the gear teeth on the jaw actuating rings.

8. A chuck comprising a head having therein an annular guideway, and a circumferentially extending slot opening into said guideway, two longitudinally spaced sets of jaws, a pair of spaced jaw actuating rings in the annular guideway, said rings having gear teeth formed on the outer edge portions of their inner faces, a floating bearing ring interposed between the inner edge portions of the aforesaid rings and having a bearing disposed adjacent the slot in the head, a pinion mounted on said bearing and having key receiving means adjacent said slot, and a shoe carried by the bearing ring and having an arcuate outer edge for permanently closing the slot.

9. A chuck comprising a head having two longitudinally spaced sets of radially movable jaws and having between said sets an annular channel concentric to its axis, a pair of axially spaced scroll rings in said channel for adjusting the two sets of jaws when moved in opposite directions, said rings having radial gear teeth on their inner faces, and an operating pinion mounted between said rings on a radial axis and meshing at diametrically opposite points on its circumference with the gear teeth of said rings.

In testimony whereof I have hereunto set my hand in presence of two subscribing witnesses.

ALBERT E. CHURCH.

Witnesses:
CARL S. MUELLER,
H. E. MYERS.